US008421614B2

(12) United States Patent
Cagno et al.

(10) Patent No.: US 8,421,614 B2
(45) Date of Patent: Apr. 16, 2013

(54) RELIABLE REDUNDANT DATA COMMUNICATION THROUGH ALTERNATING CURRENT POWER DISTRIBUTION SYSTEM

(75) Inventors: Brian James Cagno, Tucson, AZ (US); John Charles Elliott, Tucson, AZ (US); Kenny Nian Gan Qiu, Tucson, AZ (US); Donald Scott Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1609 days.

(21) Appl. No.: 11/857,778

(22) Filed: Sep. 19, 2007

(65) Prior Publication Data
US 2009/0072953 A1    Mar. 19, 2009

(51) Int. Cl.
*H04Q 1/30*    (2006.01)
(52) U.S. Cl.
USPC ............. 340/538; 340/538.11; 340/12.32; 340/12.33; 340/12.34; 340/12.35; 340/12.36; 340/12.37; 340/12.38; 340/12.39; 340/568.2; 379/413.03; 307/1; 307/2; 307/3
(58) Field of Classification Search ............. 340/310.12, 340/12.32–12.39, 538, 538.11, 568.2; 307/64, 307/1–3; 379/413.03
See application file for complete search history.

(56) References Cited

U.S. PATENT DOCUMENTS

| 4,057,793 | A |   | 11/1977 | Johnson et al. |
| 4,218,655 | A |   | 8/1980 | Johnston et al. |
| 4,715,045 | A |   | 12/1987 | Lewis et al. |
| 4,958,270 | A | * | 9/1990 | McLaughlin et al. ......... 700/82 |
| 5,117,430 | A | * | 5/1992 | Berglund ...................... 370/408 |
| 5,142,470 | A | * | 8/1992 | Bristow et al. ................. 700/79 |
| 5,198,796 | A |   | 3/1993 | Hessling, Jr. |
| 5,198,810 | A |   | 3/1993 | Harel |
| 5,205,318 | A |   | 4/1993 | Massaro et al. |
| 5,455,932 | A | * | 10/1995 | Major et al. .................. 711/162 |
| 5,777,874 | A |   | 7/1998 | Flood et al. |
| 5,812,748 | A |   | 9/1998 | Ohran et al. |
| 5,815,652 | A |   | 9/1998 | Otc et al. |
| 5,828,569 | A | * | 10/1998 | Fisher ............................ 700/82 |
| 5,835,780 | A |   | 11/1998 | Osaki et al. |
| 5,835,953 | A |   | 11/1998 | Ohran |

(Continued)

OTHER PUBLICATIONS

Appeal Brief filed Oct. 14, 2011, U.S. Appl. No. 11/742,026, 33 pages.

(Continued)

*Primary Examiner* — Benjamin C Lee
*Assistant Examiner* — Quang D Pham
(74) *Attorney, Agent, or Firm* — Francis Lammes; Stephen J. Walder, Jr.; Randall J. Bluestone

(57) ABSTRACT

A mechanism is provided for providing reliable redundant data communications. The mechanism issues a request for data to a set of powered elements using a set of secondary communication channels in response to a reduction in a level of communications being detected. The set of secondary communication channels comprises one or more alternating current power lines and the request is sent as data injected onto the alternating current power lines to the set of powered elements. The mechanism receives the data using the set of secondary communication channels from the set of powered elements, analyzes the data to determine a set of recovery actions to restore the level of communications, and issues the set of recovery actions to the set of powered elements using the set of secondary communication channels.

20 Claims, 6 Drawing Sheets

U.S. PATENT DOCUMENTS

| | | | |
|---|---|---|---|
| 5,838,921 | A | 11/1998 | Speeter |
| 5,903,594 | A | 5/1999 | Saulnier et al. |
| 5,941,999 | A | 8/1999 | Matena et al. |
| 6,023,772 | A | 2/2000 | Fleming |
| 6,119,215 | A | 9/2000 | Key et al. |
| 6,122,256 | A * | 9/2000 | Berglund ............... 370/241 |
| 6,154,488 | A | 11/2000 | Hunt |
| 6,175,490 | B1 | 1/2001 | Papa et al. |
| 6,188,314 | B1 * | 2/2001 | Wallace et al. ............ 340/438 |
| 6,188,973 | B1 | 2/2001 | Martinez et al. |
| 6,407,987 | B1 | 6/2002 | Abraham |
| 6,459,571 | B1 | 10/2002 | Carteau |
| 6,522,737 | B1 | 2/2003 | Bartolutti et al. |
| 6,535,110 | B1 | 3/2003 | Arora et al. |
| 6,587,037 | B1 | 7/2003 | Besser et al. |
| 6,760,859 | B1 | 7/2004 | Kim et al. |
| 6,956,463 | B2 | 10/2005 | Crenella et al. |
| 6,980,091 | B2 | 12/2005 | White, II et al. |
| 7,007,305 | B2 | 2/2006 | Carson et al. |
| 7,102,490 | B2 | 9/2006 | Flen et al. |
| 7,173,938 | B1 | 2/2007 | Davidow |
| 7,236,765 | B2 | 6/2007 | Bonicatto et al. |
| 7,286,026 | B2 | 10/2007 | Law |
| 7,327,222 | B2 | 2/2008 | Peltonen |
| 7,327,223 | B1 * | 2/2008 | Schlinger ............... 340/12.32 |
| 7,386,744 | B2 | 6/2008 | Barr et al. |
| 7,406,231 | B1 | 7/2008 | Beck et al. |
| 7,432,824 | B2 | 10/2008 | Flen et al. |
| 7,502,669 | B1 | 3/2009 | Evans et al. |
| 7,667,855 | B2 | 2/2010 | Piazza |
| 7,694,029 | B2 | 4/2010 | Kubo et al. |
| 7,742,393 | B2 * | 6/2010 | Bonicatto et al. ............ 370/216 |
| 7,774,633 | B1 * | 8/2010 | Harrenstien et al. .......... 713/323 |
| 2002/0196128 | A1 | 12/2002 | Gaus, Jr. et al. |
| 2003/0076221 | A1 | 4/2003 | Akiyama et al. |
| 2003/0107471 | A1 | 6/2003 | Tsubone |
| 2003/0133473 | A1 | 7/2003 | Manis et al. |
| 2003/0197619 | A1 | 10/2003 | Lawrence et al. |
| 2004/0061486 | A1 | 4/2004 | Peeke et al. |
| 2004/0233929 | A1 | 11/2004 | Hall et al. |
| 2005/0076255 | A1 | 4/2005 | Bresniker et al. |
| 2005/0111560 | A1 | 5/2005 | Haines |
| 2005/0137894 | A1 | 6/2005 | Espinoza-Ibarra et al. |
| 2005/0185363 | A1 | 8/2005 | Rasmussen et al. |
| 2005/0267639 | A1 | 12/2005 | Sharma et al. |
| 2006/0038445 | A1 | 2/2006 | Yanagida et al. |
| 2006/0044117 | A1 | 3/2006 | Farkas et al. |
| 2006/0071559 | A1 * | 4/2006 | Hanson et al. ................ 307/43 |
| 2007/0041545 | A1 | 2/2007 | Gainsboro |
| 2007/0101393 | A1 | 5/2007 | Ito |
| 2007/0135155 | A1 | 6/2007 | Lehr et al. |
| 2007/0154011 | A1 * | 7/2007 | Yoshihara et al. ....... 379/413.03 |
| 2007/0160172 | A1 | 7/2007 | Koga et al. |
| 2007/0252440 | A1 * | 11/2007 | Zimmerman et al. .......... 307/64 |
| 2007/0273205 | A1 | 11/2007 | Aoyama |
| 2008/0133047 | A1 | 6/2008 | Best et al. |
| 2008/0157995 | A1 | 7/2008 | Crist |
| 2008/0266077 | A1 | 10/2008 | Cagno et al. |
| 2009/0002136 | A1 | 1/2009 | Taguchi |
| 2009/0121845 | A1 | 5/2009 | Juillot et al. |
| 2009/0184574 | A1 * | 7/2009 | Zavidniak et al. ............. 307/9.1 |
| 2009/0204729 | A1 | 8/2009 | Best et al. |

OTHER PUBLICATIONS

Notice of Allowance mailed on Nov. 2, 2011 for U.S. Appl. No. 11/742,026; 25 pages.

Office Action mailed May 23, 2011 for U.S. Appl. No. 11/742,026; 25 pages.

Response to Final Offfice Action filed May 4, 2011, U.S. Appl. No. 11/742,026, 26 pages.

USPTO U.S. Appl. No. 11/742,026.

USPTO U.S. Appl. No. 11/862,593.

U.S. Appl. No. 11/742,026, filed Apr. 30, 2007, Cagno et al.

"Automated Method for Physically Mapping HW Locations in a Data Center", IBM Corporation, Technical Disclosure, http://www.ip.com/pubview/IPCOM000, Nov. 14, 2006, 4 pages.

Final Office Action mailed from USPTO on Feb. 15, 2011 for U.S. Appl. No. 11/742,026; 25 pages.

Interview Summary mailed from USPTO on Nov. 29, 2010 for U.S. Appl. No. 11/742,026; 15 pages.

Response to Office Action filed Nov. 29, 2010, U.S. Appl. No. 11/742,026, 20 pages.

Notice of Allowance mailed on Sep. 1, 2010 for U.S. Appl. No. 11/862,593; 5 pages.

Office Action mailed on Sep. 1, 2010 for U.S. Appl. No. 11/742,026; 21 pages.

* cited by examiner

RELIABLE REDUNDANT DATA COMMUNICATION THROUGH ALTERNATING CURRENT POWER DISTRIBUTION SYSTEM

BACKGROUND

1. Technical Field

The present application relates generally to data processing system communications. More specifically, the present application is directed to providing reliable redundant data communications through an alternating current power distribution system.

2. Description of Related Art

Known enterprise computer or storage systems use built-in redundancy communication designs. However, even with redundant communication designs, events occur where one or more communication failures trigger a complete loss of communication access to the elements in the computer or storage system. For example, in some known storage enclosure designs where numerous storage enclosures are cabled in daisy-chain or loop configuration, one bad disk drive module (DDM) may cause an entire storage element to fail. The failure of one storage enclosure may in turn cause the storage system to lose communication access to all storage elements due to the loop configuration. When such a failure occurs, the capability of capturing first time data for error analysis is diminished. The lack of error analysis inhibits the establishment of an effective recovery scheme to identify and isolate the failure.

Known solutions for failure recovery involve a prior provision of additional communication cables to provide redundant communication paths or using the local processor, such as a Small Computer System Interface (SCSI) Enclosure Services (SES) processor embedded in the storage enclosures, to blindly reset a communication switch in hope that the communication loop recovers after reset. A local processor in one storage enclosure cannot oversee the loss of communication access to all of the storage enclosures in the loop configuration. Thus, resetting only one storage enclosure may not provide a recovery solution that is effective.

Another known solution for identifying a failing component that causes a loss of communication access is to use a binary search algorithm to identify the failing component. A binary search algorithm is software that methodically attempts to identify a failing component within a storage enclosure. When local processors within a storage enclosure detect an event where communication access has been lost and the local processors are not sure which component caused the loss of communication access, the local processors may start a binary search algorithm to identify the failing component. The binary search algorithm first bypasses all components within the storage enclosure. The binary search algorithm allows half of the components to connect to the communication loop to determine if the communication access is recovered. If the communication access is recovered, then the problematic component is on the other half of components. If the loss of communication access still exists, then the problematic component is in the half of the components that were allowed to connect.

The binary search algorithm continues to divide the determined errored half of the components by half to narrow the component group, until the problematic component is found or the problem cannot be resolved. This method is effective when the loss of communication access is caused by a solid component failure, which is the component that is completely broken and not experiencing intermittent errors. However, a binary search algorithm may take up to thirty seconds to search one storage enclosure and each binary search algorithm is not the same or asynchronous for all storage enclosures connected to the communication loop. Thus, when a component failure is intermittent, the binary search algorithm usually fails in determining the failed or failing component. Moreover, the identification process described above is limited to the scope of one storage enclosure, which has a very limited view of the overall communication loop status as each storage enclosure is not aware of the status of the other storage enclosures.

SUMMARY

The illustrative embodiments provide mechanisms for reliable redundant data communications through an alternating current power distribution system. With the illustrative embodiments, in the event of a reduction or loss of communication access over primary communication channels to a set of powered elements, recovery actions are performed through secondary communication channels. The secondary communication channels are provided by injecting communication data onto the alternating current (AC) power connections that provide power to the powered elements. The data injected onto the AC power connections is used by the powered elements to collect status and error information from the powered elements. The information is analyzed to determine a recovery action that may restore the primary communication channels.

The illustrative embodiments provide for reliable redundant data communications. The illustrative embodiments detect a reduction in a level of communications over a set of primary communication channels to a set of powered elements. The illustrative embodiments issue a request for data to the set of powered elements using a set of secondary communication channels in response to a reduction in the level of communications being detected. In the illustrative embodiments, the set of secondary communication channels comprises one or more alternating current power lines and the request is sent as data injected onto the alternating current power lines to the set of powered elements. The illustrative embodiments receive the data using the set of secondary communication channels from the set of powered elements, analyze the data to determine a set of recovery actions to restore the level of communications; and issue the set of recovery actions to the set of powered elements using the set of secondary communication channels.

Additionally, the illustrative embodiments detect restoration of the set of primary communication channels to the set of powered elements. In receiving the data from the set of powered elements, the illustrative embodiments receive the alternating current power lines with the data and extract the data from the alternating current power lines. In the illustrative embodiments, the request for data is a data capture command and the data capture command is at least one of error logging, event tracing, or register dumping. In the illustrative embodiments, the set of recovery actions include at least one of an isolation command or a reset command.

In the illustrative embodiments, a powered element in the set of powered elements is a field replaceable unit and the field replaceable unit is at least one of a computer, router, switch, modular storage element, controller, printer, disk drive module, or serial attached SCSI hard disk drive. In the illustrative embodiments, the set of powered elements reside within a set of equipment racks in a rack system.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

The illustrative embodiments provide mechanisms for reliable redundant data communications through an alternating current power distribution system. With the illustrative embodiments, in the event of an error occurring in a powered element configuration, redundant data communications are provided through a data processing device that injects communication data onto the power connections that provide power to the powered elements using addressing information embedded within the communication data.

Figure 1:
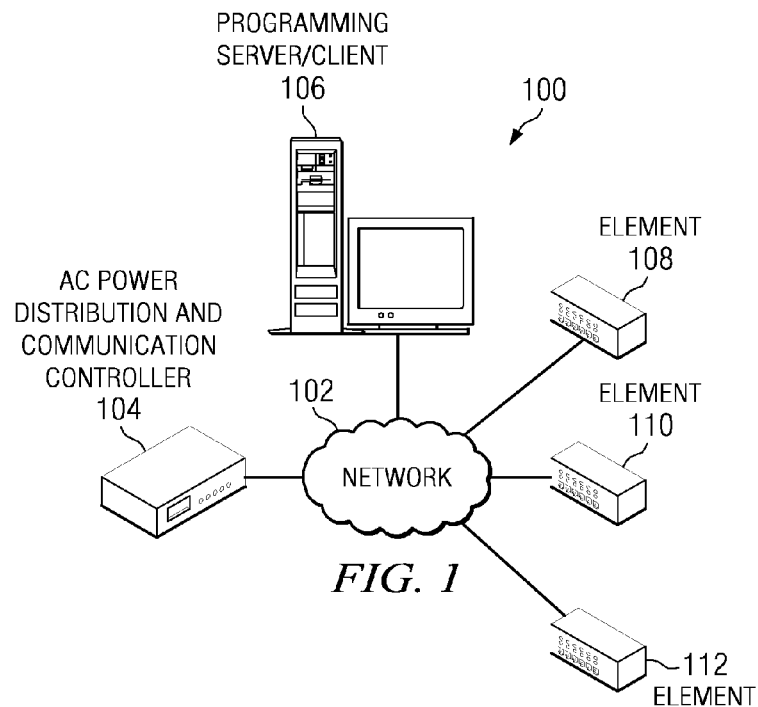
FIG. 1 is an exemplary representation of an exemplary distributed data processing system in which aspects of the illustrative embodiments may be implemented.
Figure 2:
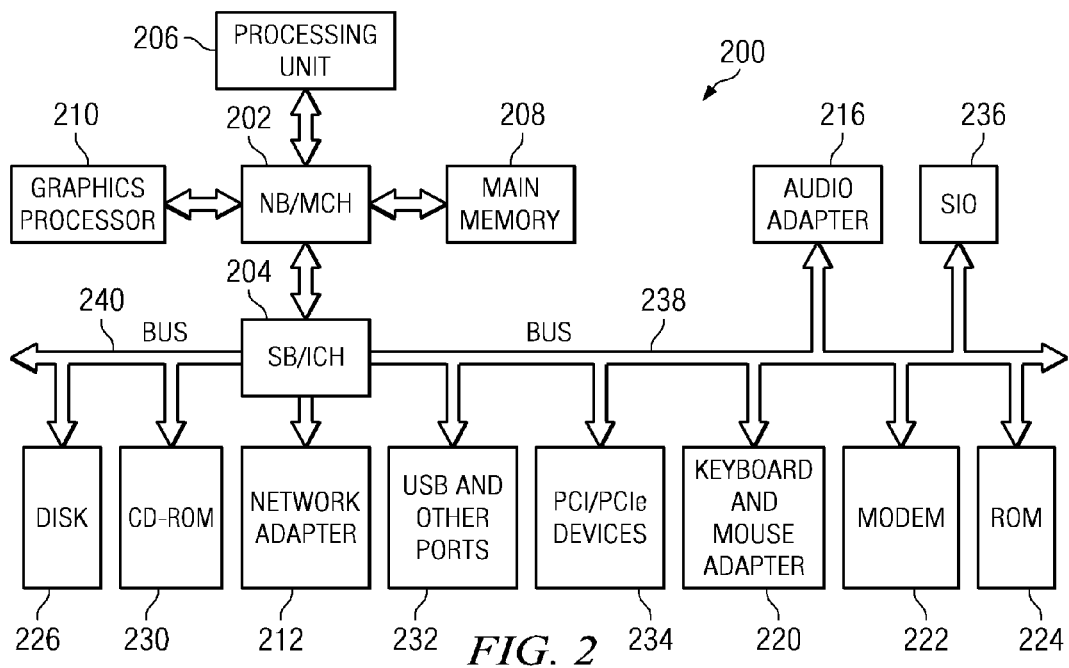
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 is a representation of an exemplary distributed data processing system in which aspects of the illustrative embodiments may be implemented. Distributed data processing system 100 may include a network of data processing systems in which aspects of the illustrative embodiments may be implemented. Distributed data processing system 100 may also be referred to as a network node, which is a grouping of one or more network elements, at one or more sites, which provides network related functions, and is administered as a single entity. A single site may contain more than one network node. Distributed data processing system 100 contains at least one network 102, which is the medium used to provide communication links between various devices and computers connected together within distributed data processing system 100. Network 102 may include connections, for example, wired links, wireless communication links, fiber optic cables, or the like.

In the depicted example, alternating current (AC) power distribution and communication (ACPDC) controller 104 and programming server/client 106 may be connected to network 102. ACPDC controller 104 and programming server/client 106 may be separate devices or one device performing both functions.

Powered elements 108, 110, and 112 may also be connected to network 102. Powered elements 108, 110, and 112 may be mounted within equipment racks within distributed data processing system 100. One or more equipment racks housing powered elements, such as powered elements 108, 110, and 112, may be referred to as a rack system. Each of powered elements 108, 110, and 112 may be a field replaceable unit (FRU). A FRU may be, for example, a circuit board, part, or assembly that may be quickly and easily removed from a personal computer or other piece of electronic equipment and replaced by the user or by a technician without having to send the entire product or system to a repair facility. Examples of powered elements 108, 110, and 112 may be computers, routers, switches, modular storage elements, controllers, printers, serial attached SCSI hard disk drive (SAS HDD), or the like. Each of powered elements 108, 110, and 112 may have a unique network address, sometimes called a data link control (DLC) address, media access control (MAC) address, or the like.

The unique network address may be part of vital product data (VPD) of powered elements 108, 110, and 112. VPD is information provided in association with powered elements 108, 110, and 112, such as in a storage device of powered elements 108, 110, and 112, and which may be loaded into ACPDC controller 104 when powered elements 108, 110, and 112 are initiated in the system, for example. VPD information may also be provided separately from powered elements 108, 110, and 112, and may be loaded into ACPDC controller 104. The unique network address allows powered elements 108, 110, and 112 to be administered at a system or network level by ACPDC controller 104. Vital product data may include element model number, a unique serial number, product release level, maintenance level, address, or other information specific to the device type. Vital product data may also include user-defined information, such as the building, room, row, rack, shelf, or the like for the element. The collection and use of vital product data allows the status of a network or computer system to be understood and service provided more quickly.

In the depicted example, programming server/client 106 provides communication data, such as boot files, updated configurations, operating system images, error analysis, and applications to powered elements 108, 110, and 112 using primary communication connections, such as optical cables, wire cables, or the like. However in the event of an error, such as a disk drive module (DDM) failing, a power source failing, or the like, occurring within one or more of powered elements 108, 110, or 112 where primary communication connections become an unviable path for reconciling the error, secondary communications may be established to powered elements 108, 110, or 112 though ACPDC controller 104 using the power connections from ACPDC 104 to each of powered elements 108, 110, and 112. Powered elements 108, 110, and 112 are clients to ACPDC controller 104 in the depicted example. Distributed data processing system 100 may include additional ACPDC controllers, programming servers, programming clients, powered elements, and other devices not shown.

In the depicted example, distributed data processing system 100 is a network node with network 102 which represents both a power grid that supplies power to the powered elements that are connected to the power grid and a number of different types of networks, such as for example, an Internet, an intranet, a local area network (LAN), a wide area network (WAN), or the like. As stated above, FIG. 1 is intended as an example, not as an architectural limitation for different embodiments of the present invention, and therefore, the particular powered elements shown in FIG. 1 should not be considered limiting with regard to the environments in which the illustrative embodiments of the present invention may be implemented.

As a secondary communication means, ACPDC controller 104 injects communication data onto network 102, which provides power to powered elements 108, 110, and 112. The communication data may include instructions for error analysis, such as collecting event logs, collecting event traces, performing register dumps, or the like, of powered elements 108, 110, and 112. Powered elements 108, 110, and 112 determine if the communication data transmitted via the power lines of the power grid provided by network 102 should be used for analysis using an address embedded within the communication data. That is, each of powered elements 108, 110, and 112 receives the communication data via the AC power lines and extracts the communication data from the AC power lines. Powered elements 108, 110, and 112 compare an embedded target address within the communication data to the address of the particular element. If there is a match between the addresses, the corresponding powered element 108, 110, or 112 processes the communication data to analyze the powered element 108, 110, or 112. As a result, data may be communicated over the power lines thereby providing a redundant communication path.

In the depicted example, powered elements 108, 110, and 112 perform the instructions for error analysis and inject the error analysis data, such as event logs, event traces, register dumps, or the like, as communication data onto the power lines for ACPDC controller 104. ACPDC controller 104 extracts the communication data and sends the error analysis data to programming server/client 106 so that a recovery action may be determined to restore the primary communication connections to powered elements 108, 110, and 112.

With reference now to FIG. 2, a block diagram of an exemplary data processing system is shown in which aspects of the illustrative embodiments may be implemented. Data processing system 200 is an example of a computer, such as programming server/client 106, ACPDC controller 104, or powered element 108, 110, or 112 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Data processing system 200 operating as a programming server/client provides communication data, such as boot files, updated configurations, operating system images, error analysis, and applications to the powered elements through power-line connections or networks, such as for example, an Internet, an intranet, a local area network (LAN), a wide area network (WAN), or the like. Data processing system 200 operating as an ACPDC controller injects communication data onto a network through network adapter 212. The network provides power and communication data to powered elements. Data processing system 200 operating as a powered element determines if the communication data should be used for configuration using an address embedded within the communication data.

The illustrative embodiments provide mechanisms for reliable redundant data communications through an alternating current power distribution system. With the illustrative embodiments, in the event of an error occurring within primary communication channels, secondary communication channels are provided via the network and the ACPDC controller that injects communication data, which include data capture commands initiated by a programming server/client, onto the AC power lines that provide power to the powered elements. The powered elements extract the communication data from the AC power lines and perform the requested data capture commands. The powered elements inject the data collected from executing the data capture commands onto the AC power lines. The ACPDC controller extracts the data collected from all of the powered elements and sends the collected data onto programming server/client for analysis. The programming server/client then determines a recovery action to restore the primary communication channels.

Figure 3:
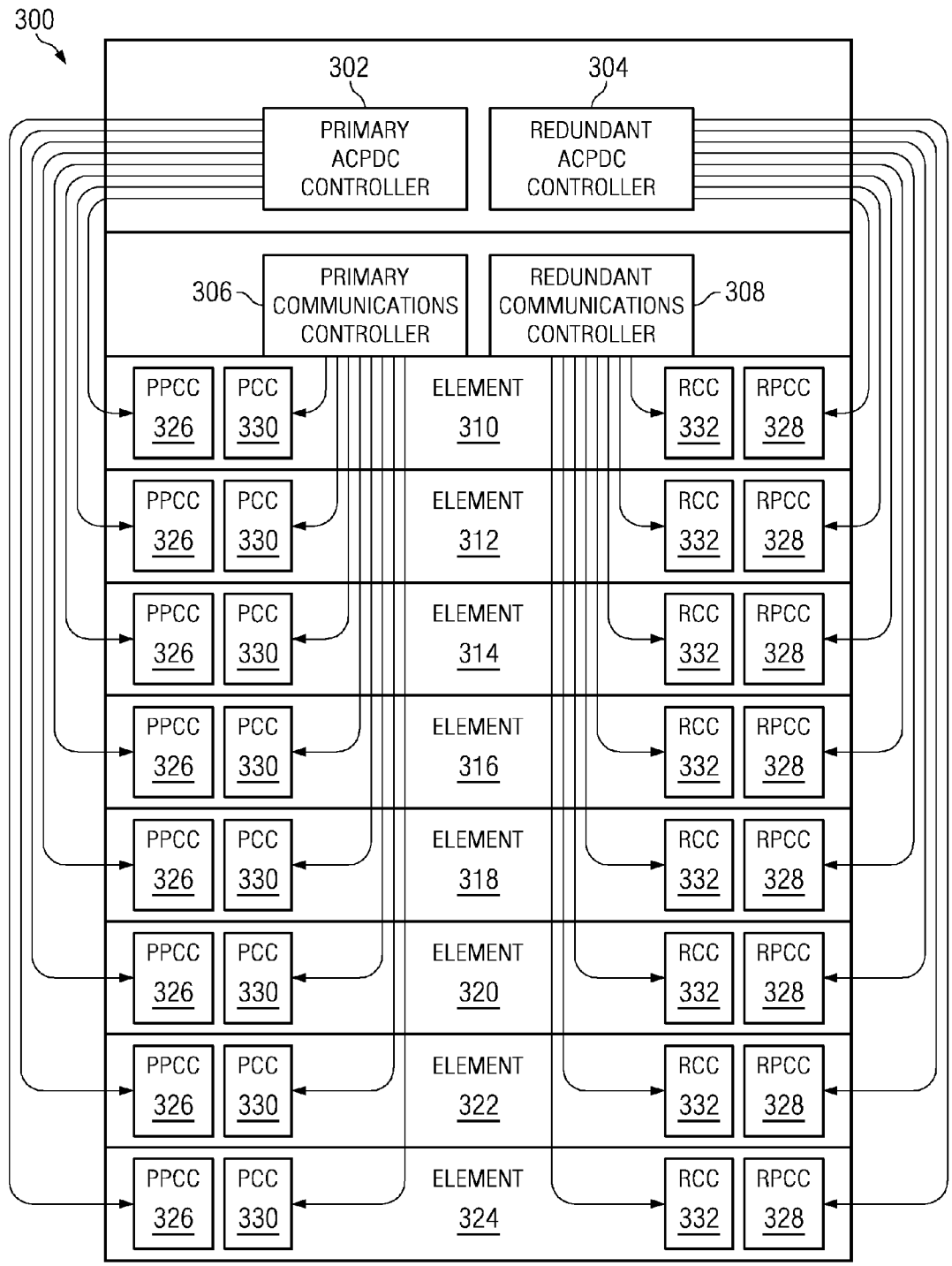
FIG. 3 depicts an improved configuration of powered elements within a network node in accordance with an exemplary embodiment.

FIG. 3 depicts an improved configuration of powered elements within a network node in accordance with an exemplary embodiment. Element configuration 300 includes primary alternating current (AC) power distribution and communication (ACPDC) controller 302, redundant ACPDC controller 304, primary communications controller 306, redundant communications controller 308, and powered elements 310-324. Primary communications controller 306 and redundant communications controller 308 provide data communications to powered elements 310-324, such as powered elements 108, 110, and 112 of FIG. 1. Primary ACPDC controller 302 and redundant ACPDC controller 304 provide power and data communications to powered elements 310-324. In the event of a loss or reduction of communication to elements 310-324 through primary communications controller 306 or redundant communications controller 308, primary ACPDC controller 302 and/or redundant ACPDC controller 304 may be used to communicate with powered elements 310-324.

Each of powered elements 310-324 includes primary power and data communication connection (PPCC) 326, redundant power and data communication connection RPCC 328, primary communication connection (PCC) 330, and redundant communication connection (RCC) 332. In the depicted configuration, each of powered elements 310-324 is separately cabled for primary AC power, redundant AC power, primary communications, and redundant communications to each element. However, in other illustrative embodiments there may be other powered element configurations, such as where communication connections are connected in a daisy-chain configuration, or the like.

In element configuration 300, primary ACPDC controller 302 and redundant ACPDC controller 304 allow for completely redundant and isolated data communication paths by injecting a high-frequency data communication carrier signal, provided from a data processing system, such as data processing system 200 of FIG. 2, onto the 60 hertz AC power lines. Thus, using combined power and data communication connections through the AC distribution allows for controlling powered elements 310-324 with commands, for example, on, off, status, error analysis, configuration, power cycling, resetting, or the like. Power cycling is the act of turning an element off and then on again. This may be performed, for example, with the intent of recovering the element from a hung or error state. Thus, a single one of primary ACPDC controller 302 and a single one of redundant ACPDC controller 304 may be configured to control all powered elements connected to the same primary and redundant power sources using power and data communication connections in the event of an error with communications through PCC 330 or RCC 332. Powered elements 310-324 determine which communication data to use by identifying address information contained within the communication data as will be described in detail below.

In the illustrative embodiment, primary communications controller 306 and redundant communications controller 308 are used to send and receive communication data to powered elements 310-324 over primary communication connections. In the event of a failure of one or more powered elements 310-324 or one or more components within one of powered elements 310-324 that causes a reduction or loss of communication access, primary communications controller 306 and redundant communications controller 308 notify a programming server/client of the reduction or loss of communication access. Primary communications controller 306 and redundant communications controller 308 determine a reduction or loss of communication access by not being able to access or establish stable communications to any one of powered elements 310-324 or one or more components within powered elements 310-324.

Recovery software on the programming server/client initiates data capture commands to powered elements 310-324. Primary ACPDC controller 302 and/or redundant ACPDC controller 304 inject the data capture commands as communication data onto the provided AC power lines to powered elements 310-324. Powered elements 310-324 extract the communication data from the AC power lines to determine if the communication data should be used using an address embedded within the communication data. That is, each of powered elements 310-324 receives the communication data via power and data communication connections or separate communication connections and extracts the communication data from the connections. Powered elements 310-324 compare an embedded target address within the communication data to the address of the particular element. If there is a match between the addresses, the corresponding one of powered elements 310-324 processes the communication data.

If the communication data is to be used by powered elements 310-324, powered elements 310-324 implement the instructions included in the communication data. In this example, powered elements 310-324 execute the data capture command initiated by the programming server/client. The data capture commands may be the collection of event logs, collection of event traces, performing a register dump, or the like. Data collected by the powered elements 310-324 is then injected onto the AC power lines. Primary ACPDC controller 302 and/or redundant ACPDC controller 304 extract the collected data from the AC power lines and send the collected data to the programming server/client. The recovery software on the programming server/client analyzes the collected data and determines a recovery action that will restore the reduction or loss of communication access over the primary communication connections. The recovery software determines a recovery action by analyzing the collected data with a combination of, for example, predetermined error codes, register values, current hardware states, past history of software and hardware events, or the like.

The determined recovery action is then injected by primary ACPDC controller 302 and/or redundant ACPDC controller 304 as communication data over the AC power lines to powered elements 310-324. Powered elements 310-324 extract the communication data, determine if the instructions are to be executed, and, if the instructions are to be executed, implement the instructions of the determined recovery actions.

Figure 4:
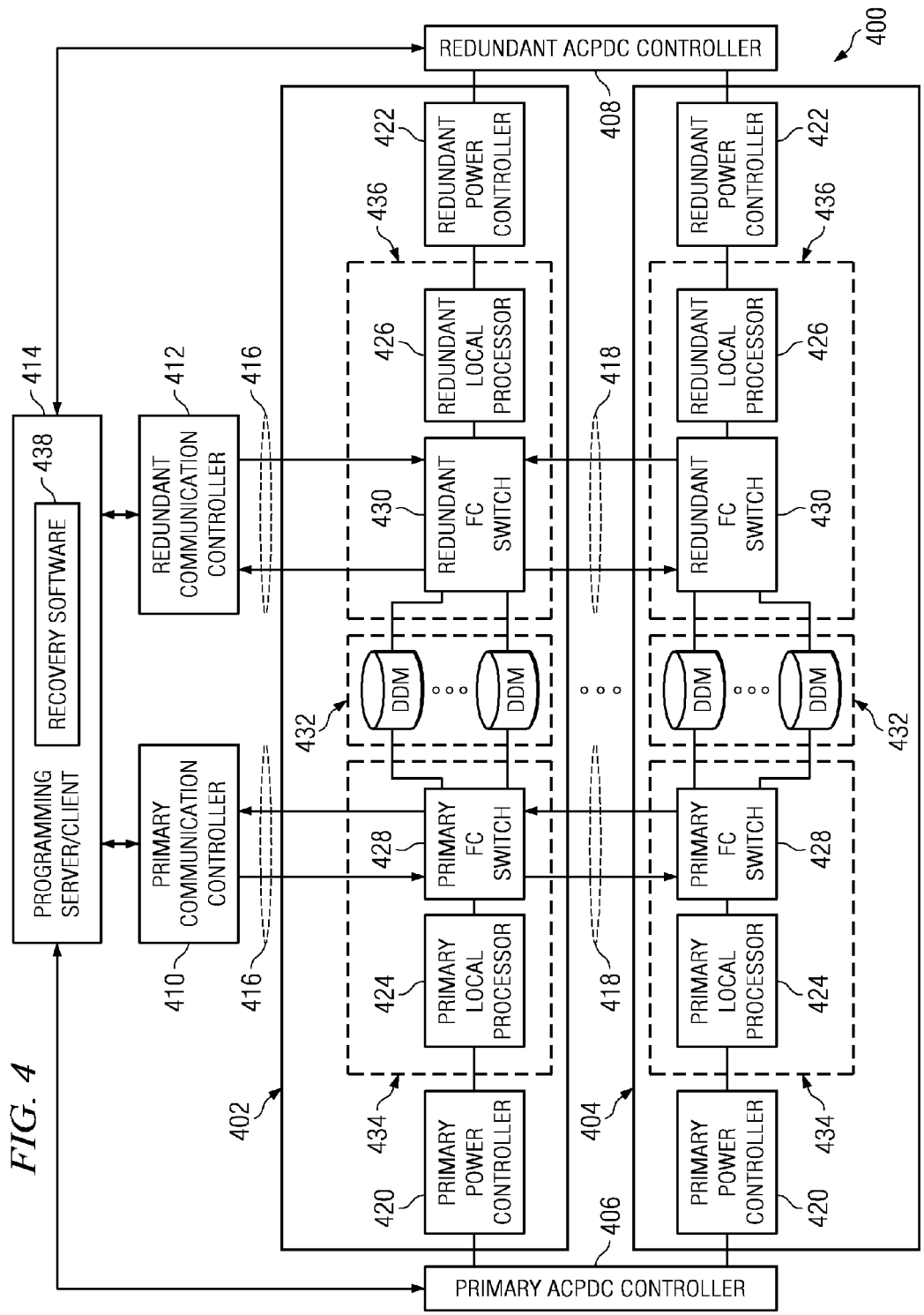
FIG. 4 illustrates an exemplary detailed configuration of powered elements in accordance with an illustrative embodiment.

FIG. 4 illustrates an exemplary detailed configuration of powered elements in accordance with an illustrative embodiment. Detailed configuration 400 depicts powered elements 402 and 404 connected to primary ACPDC controller 406, redundant ACPDC controller 408, primary communication controller 410, and redundant communication controller 412. Powered elements 402 and 404 are powered elements similar to powered elements 310-324 of FIG. 3. While only powered elements 402 and 404 are depicted, any number of powered elements may be connected in a manner similar to powered elements 402 and 404. Primary ACPDC controller 406, redundant ACPDC controller 408, primary communication controller 410, and redundant communication controller 412 are all connected to programming server/client 414 in order to receive and distribute communication data to powered elements 402 and 404.

As discussed previously in FIG. 3, powered elements 402 and 404 may be individually connected to primary communication controller 410 and redundant communication controller 412 or, as depicted, powered element 402 may be directly connected to primary communication controller 410 and redundant communication controller 412 using connections 416 and powered element 404 may be connected to powered element 402 using connections 418 in a daisy-chain or loop configuration. Powered elements 402 and 404 each may include primary power controller 420, redundant power controller 422, primary local processor 424, redundant local processor 426, primary fibre channel (FC) switch 428, redundant FC switch 430, and numerous disk drive modules (DDMs) 432. Primary local processor 424, redundant local processor 426, primary fibre channel (FC) switch 428, and redundant FC switch 430 may be separate components or components within element control cards 434 and 436, respectively. Daisy-chaining the communication connections between primary communication controller 410 and primary FC switches 428, as well as between redundant communication controller 412 and redundant FC switches 430, may create a loop configuration, such as a FC loop, or the like.

If during normal operation, primary communication controller 410 and/or redundant communication controller 412 detect an event that results in reduction or loss of communication access over the primary communication connections to powered elements 402 and 404, previously discussed known solutions may result in endless re-initialization of powered elements 402 and 404 or in failing to determine the component that cause the reduction or loss of communication access condition. Primary communication controller 410 and redundant communication controller 412 determine a reduction or loss of communication access by not being able to establish stable communications to DDMs 432, primary local processor 424, and/or redundant local processor 426 via connections 416. During reduction or loss of communication access, accessing DDMs 432 and element control cards 434 and 436 through connections 416 and connections 418 may be intermittent or impossible due to powered elements 402 and 404 being constantly reinitialized by primary local processor 424 or redundant local processor 426.

Instead of using known solutions, the illustrative embodiments initiate secondary communications to powered elements 402 and 404 through primary ACPDC controller 406 or redundant ACPDC controller 408. When an event that results in a reduction or complete loss of communication access to powered elements 402 and 404, primary communication controller 410 and/or redundant communication controller 412 report the condition to recovery software 438 on programming server/client 414, such as a Reliability, Availability, and Serviceability (RAS) software. Recovery software 438 on programming server/client 414 provides for integrity of the data stored on network components, availability to network components when needed, and diagnostics and repair features in order to regain communications in the event of a reduction or loss of communication access to components.

Using primary ACPDC controller 406 or redundant ACPDC controller 408, recovery software 438 may initiate data capture commands to powered elements 402 and 404. Primary ACPDC controller 406 and/or redundant ACPDC controller 408 inject the data capture commands as communication data onto the provided AC power lines to powered elements 402 and 404. Powered elements 402 and 404 extract the communication data from the AC power lines to determine if the communication data should be used using an address embedded within the communication data. That is, each of powered elements 402 and 404 receives the communication data via power and data communication connections or separate communication connections and extracts the communication data from the connections. Powered elements 402 and 404 compare an embedded target address within the communication data to the address of the particular element. If there is a match between the addresses, the corresponding one of powered elements 402 or 404 processes the communication data.

If the communication data is to be used by powered elements 402 and 404, powered elements 402 and 404 implement the instructions included in the communication data. In this example, powered elements 402 and 404 execute the data capture command initiated by the programming server/client. The data capture commands may be the collection of event logs, collection of event traces, performing a register dump, or the like. Data collected by the powered elements 402 and 404 is then injected onto the AC power lines. Primary ACPDC controller 406 and/or redundant ACPDC controller 408 extract the collected data from the AC power lines and send the collected data to programming server/client 414.

Recovery software 438 on programming server/client 414 uses the data, such as error logs, event traces, register dumps, or the like, collected from powered elements 402 and 404 to determine the root cause of the reduction or loss of communication access. Recovery software 438 analyzes the data collected from powered elements 402 and 404 to generate a recovery plan to identify and isolate the component that cause the reduction or loss of communication access. Recovery software 438 determines a recovery action by analyzing the collected data with a combination of, for example, predetermined error codes, register values, current hardware states, past history of software and hardware events, or the like. Once recovery software 438 identifies the failing component, recovery software 438 may issue a recovery action to be implemented by powered elements 402 and 404 thereby allowing primary communication connections to be reestablished to powered elements 402 and 404 through connections 416 and connections 418.

Figure 5:
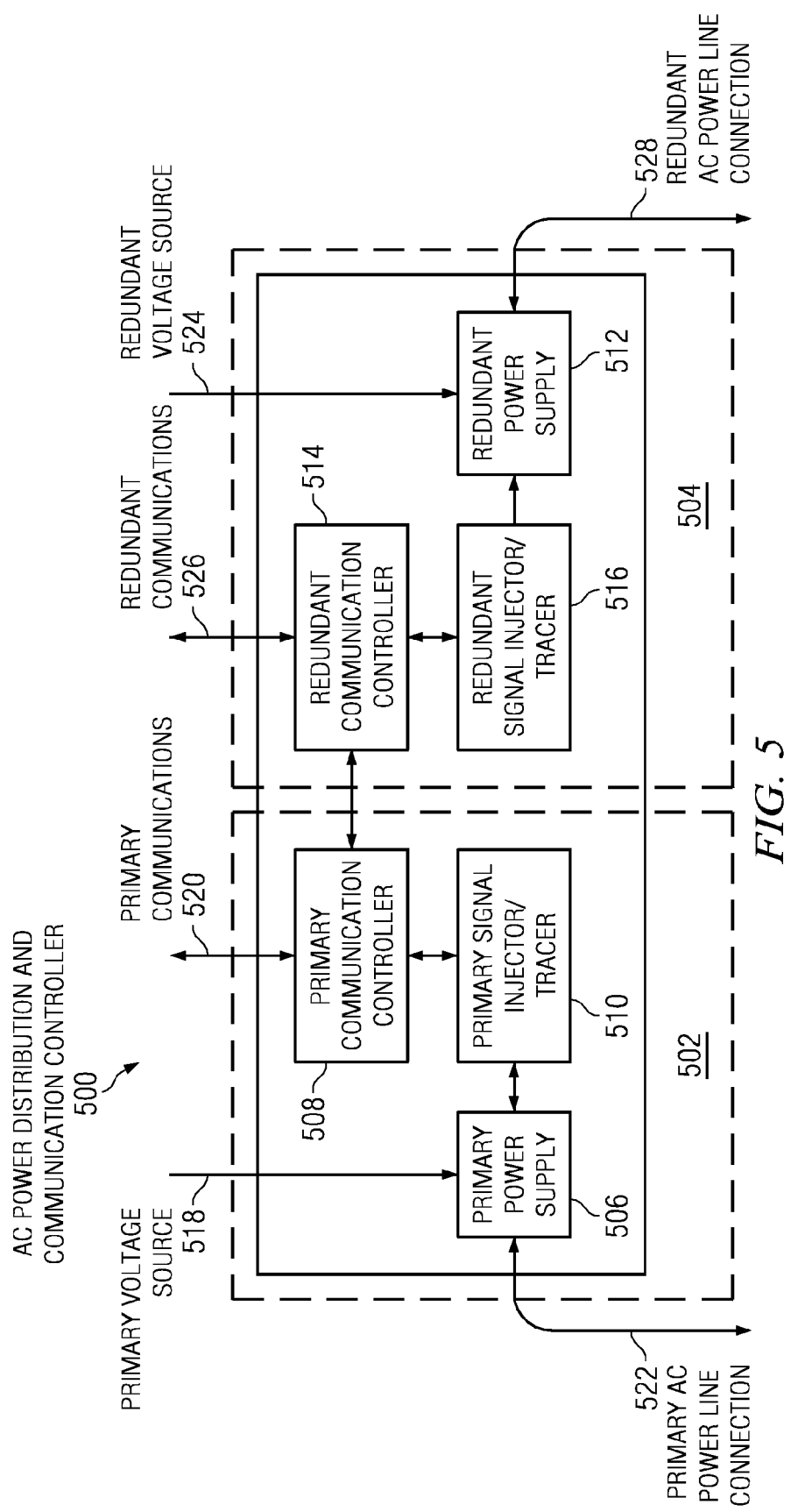
FIG. 5 depicts an exemplary ACPDC controller in accordance with an illustrative embodiment.

FIG. 5 depicts an exemplary ACPDC controller in accordance with an illustrative embodiment. ACPDC controller 500 includes primary ACPDC controller 502 and redundant ACPDC controller 504, similar to primary ACPDC controller 406 and redundant ACPDC controller 408 of FIG. 4. Primary ACPDC controller 502 includes primary power supply 506, primary communication controller 508, and primary signal injector/tracer 510. Redundant ACPDC controller 504 includes redundant power supply 512, redundant communication controller 514, and redundant signal injector/tracer 516. Primary power supply 506 receives AC power from primary voltage source 518.

Primary communication controller 508 receives and transmits primary communications 520 from and to a programming server/client. Primary communications 520 are high-frequency communication carrier signals. Primary signal injector/tracer 510 injects the high-frequency communication carrier signal received from primary communication controller 508 onto the 60 hertz AC power signal of primary power supply 506. Primary signal injector/tracer 510 is also responsible for extracting the high-frequency communication carrier signals received from a powered element. The combined signal is sent to the powered elements in the network node over primary AC power line connection 522.

Redundant power supply 512 receives AC power from redundant voltage source 524. Redundant communication controller 514 receives and transmits redundant communications 526 from and to the programming server/client. Redundant communications 526 are also high-frequency communication carrier signals. Redundant signal injector/tracer 516 injects the high-frequency communication carrier signal received from redundant communication controller 514 onto the 60 hertz AC power lines of redundant power supply 512. Redundant signal injector/tracer 516 is also responsible for extracting the high-frequency communication carrier signals received from a powered element. The combined signals are sent to the powered elements in the network node over redundant AC power line connection 528.

Thus, primary signal injector/tracer 510 injects communication data onto primary voltage source 518 to powered elements through primary AC power line connection 522. Likewise, if primary voltage source 518 fails to deliver power, primary power supply 506 ceases to function, or communications through primary communication controller 508 is lost, redundant signal injector/tracer 516 injects communication data onto redundant voltage source 524 to powered elements through redundant AC power line connection 528. That is, each of the powered elements receives the communication data via primary AC power line connection 522 or redundant AC power line connection 528 and extracts the communication data from the AC power lines.

Thus, in the event of an error occurring within primary communication channels, the ACPDC controller injects communication data that includes data capture commands from recovery software on a programming server/client onto AC power lines that serve as secondary communication channels. The ACPDC controller extracts from the AC power lines data that is collected from all of the powered elements. The ACPDC controller then sends the collected data onto programming server/client for analysis. The programming server/client then determines a recovery action to restore the primary communication channels and the recovery action instructions are injected as communication data onto the AC power lines.

Figure 6:
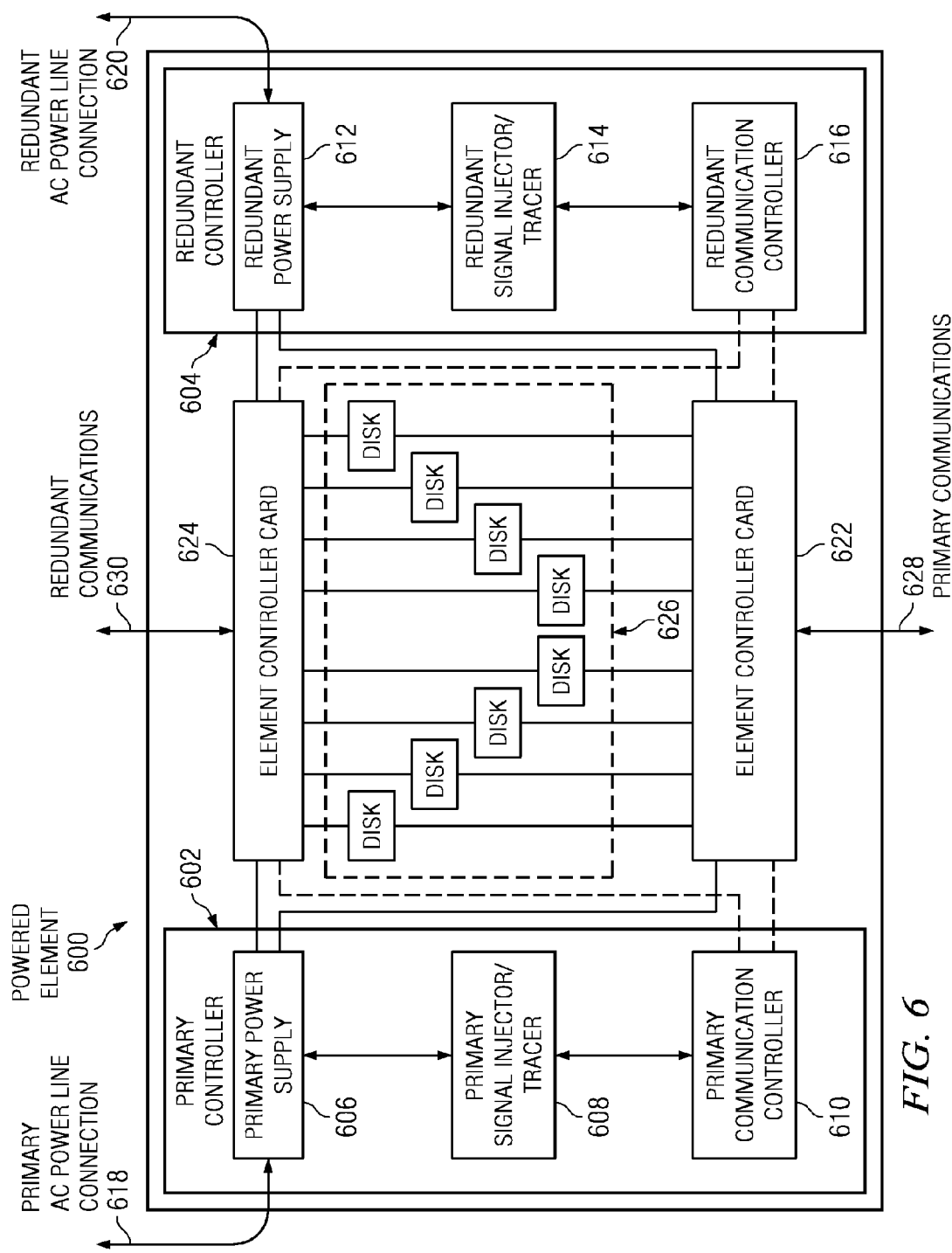
FIG. 6 depicts an exemplary powered element that receives power and communications from an ACPDC controller in accordance with an illustrative embodiment.

FIG. 6 depicts an exemplary powered element that receives power and communications from an ACPDC controller, such as ACPDC controller 500 of FIG. 5, in accordance with an illustrative embodiment. Powered element 600 includes primary controller 602 and redundant controller 604. Primary controller 602 includes primary power supply 606, primary signal injector/tracer 608, and primary communication controller 610. Powered element 600 may be a field replaceable unit, such as a serial attached SCSI hard disk drive (SAS HDD), storage enclosure, or the like. Redundant controller 604 includes redundant power supply 612, redundant signal injector/tracer 614, and redundant communication controller 616.

Primary power supply 606 receives AC power from the primary power supply of an ACPDC controller over primary AC power line connection 618. Primary signal injector/tracer 608 extracts the high-frequency communication carrier signal received from the ACPDC controller and sends the signal to primary communication controller 610, which is a data processing system. Primary signal injector/tracer 608 is also responsible for injecting any returning high-frequency communication carrier signals received from primary communication controller 610 onto the 60 hertz AC power lines of primary power supply 606. Primary communication controller 610 receives and transmits signals from and to primary signal injector/tracer 608. Communication signals received by primary communication controller 610 from primary signal injector/tracer 608 may be powered element commands, for example, on, off, status, configuration, power cycling, or the like.

Since the communications signal is sent to each powered element connected to the ACPDC controller, primary communication controller 610 determines if the received command is for the particular powered element by identifying the address information included in the communication signal. If the address in the address information is not the address of the particular powered element, then primary communication controller 610 simply ignores the communication signal. However, if the address in the address information is the address of powered element 600, then primary communication controller 610 initiates the command included in the communication signal for the device within powered element 600, such as element controller card 622 or 624, hard disk drives 626, or the like depending on which devices are within the powered element. Element control cards 622 and 624 receive normal communication data through primary communications 628 or redundant communications 630 except in the event when normal communications are lost from primary communications 628 and redundant communications 630.

Redundant power supply 612 operates in a similar manner to primary controller 602. Redundant power supply 612 receives AC power from the redundant power supply of an ACPDC controller over redundant AC power line connection 620. Redundant signal injector/tracer 614 extracts the high-frequency communication carrier signal and sends the signal to redundant communication controller 616. Redundant signal injector/tracer 614 also injects any returning high-frequency communication carrier signals onto the 60 hertz AC power lines of redundant power supply 612. Redundant communication controller 616 receives and transmits signals from and to redundant signal injector/tracer 614.

Again, since the communications signal is sent to each powered element connected to the ACPDC controller, redundant communication controller 616 determines if the received command is for the particular powered element and if the address in the address information is the address of powered element 600, then redundant communication controller 616 initiates the command included in the communication signal for the device within powered element 600.

Redundant controller 604 continually monitors the functions performed by primary controller 602. Likewise, primary controller 602 continually monitors the functions performed by redundant controller 604. In the event the primary voltage source fails to deliver power, primary power supply 606 ceases to function, or communications through primary communication controller 610 is lost, for a predetermined amount of time, redundant controller 604 seizes control of powered element 600. Likewise, if the primary voltage source resumes delivering power, primary power supply 606 resumes function, or communications through primary communication controller 610 is returned, then primary controller 602 resumes control of powered element 600.

Thus, powered element 600 receives the communication data via the primary AC power line connection 618 or, in the event of a primary failure, redundant AC power line connection 620 extracts the communication data from the AC power lines. Powered element 600 compares an embedded target address within the communication data to the address of the particular element. If there is a match between the addresses, powered element 600 processes the communication data.

Thus, the powered element receives communication data from an ACPDC controller. The powered element extracts the communication data from the AC power lines, determines if the communication data should be implemented and, if so, the powered element performs the requested data capture commands. The powered element injects the data collected from executing the data capture commands onto the AC power lines. The powered element may then receive additional communication data that includes instructions for a recovery action that is determined by recovery software. The powered element again extracts the communication data from the AC power lines, determines if the communication data includes instructions that are to be implemented by the powered element and, if so, performs the recovery action instructions that will restore the primary communication connections.

Figure 7:
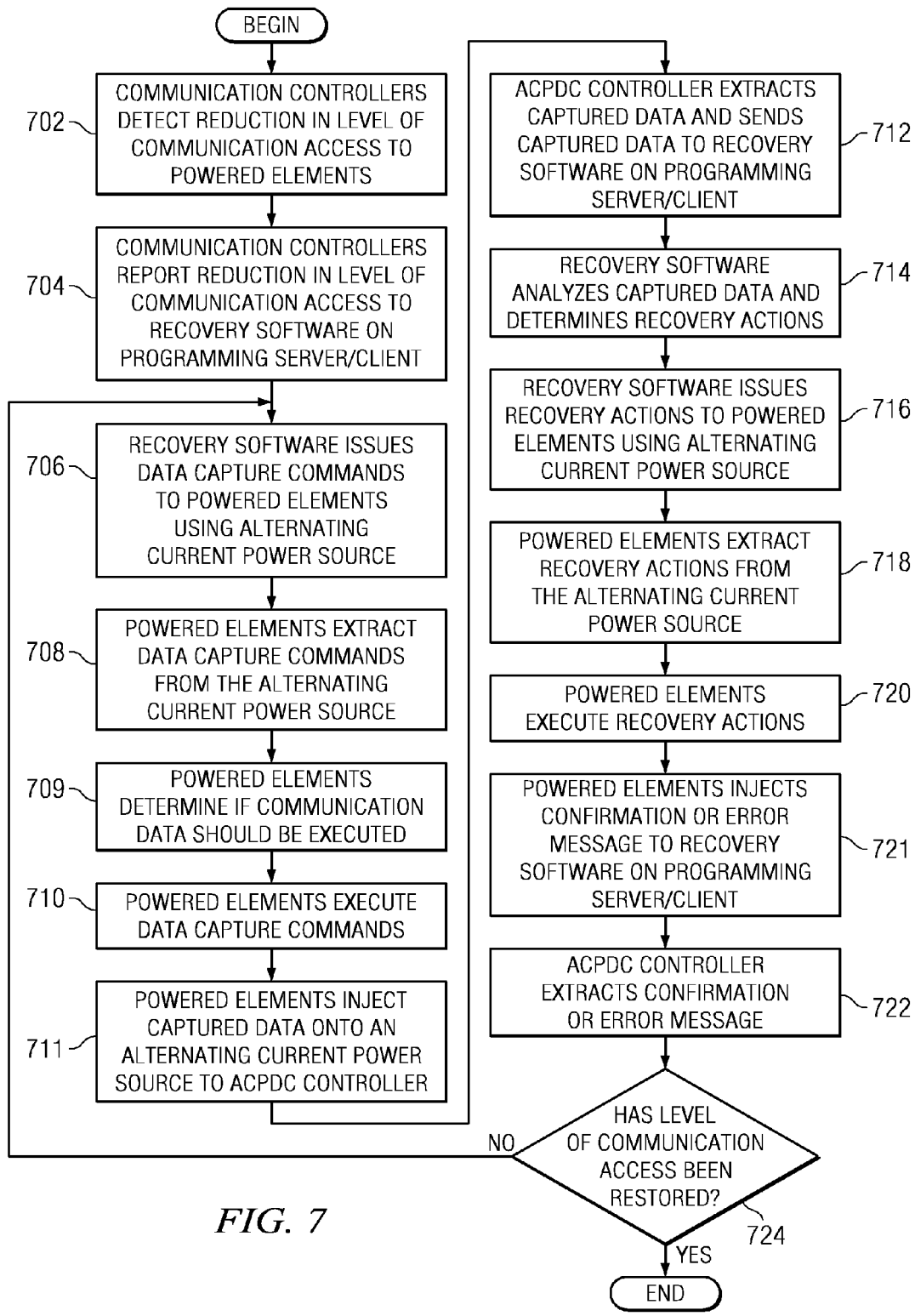
FIG. 7 is a flow diagram of the operations performed in providing reliable redundant data communications through an alternating current power distribution system in accordance with an illustrative embodiment.

FIG. 7 is a flow diagram of the operations performed in providing reliable redundant data communications through an alternating current power distribution system in accordance with an illustrative embodiment. FIG. 7 is a flowchart outlining an exemplary operation according to the invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

As the operation begins the primary and redundant communication controllers, such as primary communication controller 410 and redundant communication controller 412 of FIG. 4, detect a reduction in the level communication access over primary communication channels to the powered elements that the controllers are connected to (step 702). Reduction in the level of communication access may be a partial or complete loss of communication access and may occur through an event, such as a disk drive module (DDM) failing, a power source failing, or the like. Primary and redundant communication controllers may determine a reduction or loss of communication access by not being able to access or establish stable communications to any of the powered elements or the components within the powered elements. When primary and redundant communication controllers detect a reduction in the level of communication access over primary communication channels, the primary and redundant communication controllers report the reduction in the level of communication access to the recovery software on a programming server/client (step 704).

The recovery software issues data capture commands over secondary communication channels to the powered elements by injecting the data capture commands as communication data onto the alternating current (AC) power source through primary ACPDC controller and/or redundant ACPDC controller (step 706). Data capture commands may be, for example, collecting error logs, collecting event traces, performing register dumps, or the like. The powered elements monitor the incoming AC power source to determine if communication data is detected on the AC power source and, if communication data is detected, the powered elements extract the communication data from the AC power source (step 708).

The powered elements determine if the communication data is to be executed by comparing an embedded target address within the communication data to the address of the particular element (step 709). If the addresses do not match, the powered elements ignore the communication data. If the addresses match, the powered element executes the data capture commands included in the communication data (step 710). Once the powered elements finish executing the data capture commands, the powered elements inject the captured data within communication data onto the AC power source back to the ACPDC controller (step 711). The ACPDC controller extracts the captured data from the AC power source and sends it to the recovery software on the programming server/client (step 712).

The recovery software analyzes the collected data to determine a recovery action that will restore normal communication access (step 714). The recovery software determines a recovery action by analyzing the collected data with a combination of, for example, predetermined error codes, register values, current hardware states, past history of software and hardware events, or the like. The recovery software issues recovery actions to the powered elements by injecting the recovery actions as communication data onto the AC power source (step 716). The powered elements monitor the incoming AC power source to determine if communication data is detected on the AC power source and, if communication data is detected, the powered elements extract the communication data that includes the recovery actions from the AC power source (step 718). The powered elements execute the recovery actions included in the communication data (step 720).

Once the powered elements finish executing the recovery actions, the powered elements inject a confirmation or error message to the recovery software on the programming server/client (step 721). The ACPDC controller extracts the confirmation or error message from the AC power source and sends it to the recovery software on the programming server/client (step 722). The recovery software then determines if the level of communication access has been restored over primary communication channels (step 724). The primary and redundant communication controllers determine if the level of communication access has been restored by being able to establish stable communications to the DDMs, the primary local processor, and/or the redundant local processor. If at step 724 the level of communication access has not been restored, then the operation returns to step 706. If at step 724 the level of communication access has been restored, the operation ends.

Thus, the illustrative embodiments provide for reliable redundant data communications. In the illustrative embodiments a controller detects a reduction in a level of communications over a set of primary communication channels to a set of powered elements. A programming server/client issues a request for data to the set of powered elements using a set of secondary communication channels in response to a reduction in the level of communications being detected. In the illustrative embodiments, the set of secondary communication channels comprises one or more alternating current power lines and the request is sent as data injected onto the alternating current power lines to the set of powered elements. The programming server/client receives the data using the set of secondary communication channels from the set of powered elements, analyzes the data to determine a set of recovery actions to restore the level of communications; and issues the set of recovery actions to the set of powered elements using the set of secondary communication channels.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable medium having a computer readable program, wherein the computer readable program, when executed in a data processing system in a programming device, causes the data processing system to:

detect a reduction in a level of communications to one or more powered elements in a set of powered elements over a primary communication channel coupled to a primary communication controller in each of the set of powered elements, wherein the primary communication channel being coupled to the primary communication controller in each of the set of powered elements forms a set of primary communication channels to the set of powered elements, wherein each primary communication controller is further coupled to a secondary communication channel, and wherein the secondary communication channel being coupled to the primary communication controller in each of the set of powered elements forms a set of secondary communication channels to the set of powered elements;

issue a request for data to the one or more powered elements using one or more of the secondary communication channels in the set of secondary communication channels in response to a reduction in the level of communications to the one or more powered elements being detected, wherein the set of secondary communication channels comprises one or more alternating current power lines and wherein the request is sent as data injected onto the alternating current power lines to the primary communication controller in each of the one or more powered elements;

receive the data using the set of one or more of the secondary communication channels from the one or more powered elements;

analyze the data to determine a set of recovery actions to restore the level of communications to the one or more powered elements in the set of powered elements over the set of primary communication channels coupled to the primary communication controller in each of the one or more powered elements; and issue the set of recovery actions to the one or more powered elements using the one or more of the secondary communication channels, wherein the set of recovery action is received by the primary communication controller in each of the one or more powered elements and wherein a primary controller in each of the one or more powered elements execute the recovery actions to restore the level of communications to the one or more powered elements in the set of powered elements over the set of primary communication channels coupled to the primary communication controller in each of the one or more powered elements.

2. The computer program product of claim 1, wherein the computer readable program further includes a computer readable program that causes the data processing system to:

detect, via the primary communication controller, restoration of the one or more primary communication channels to the one or more powered elements.

3. The computer program product of claim 1, wherein the computer readable program to receive the data from the one or more powered elements further includes a computer readable program that causes the data processing system to:

receive the alternating current power lines with the data; and extract the data from the alternating current power lines.

4. The computer program product of claim 1, wherein the request for data is a data capture command and wherein the data capture command is at least one of error logging, event tracing, or register dumping.

5. The computer program product of claim 1, wherein the set of recovery actions include at least one of an isolation command or a reset command.

6. The computer program product of claim 1, wherein a powered element in the set of powered elements is a field replaceable unit and wherein the field replaceable unit is at least one of a computer, router, switch, modular storage element, controller, printer, disk drive module, or serial attached SCSI hard disk drive.

7. The computer program product of claim 1, wherein the set of powered elements reside within a set of equipment racks in a rack system.

8. A system, comprising:
a processor; and
a memory coupled to the processor, wherein the memory comprises instructions which, when executed by the processor, cause the processor to:

detect a reduction in a level of communications to one or more powered elements in a set of powered elements over a primary communication channel coupled to a primary communication controller in each of the set of powered elements, wherein by the primary communication channel being coupled to the primary communication controller in each of the set of powered elements forms a set of primary communication channels to the set of powered elements, wherein each primary communication controller is further coupled to a secondary communication channel, and wherein the secondary communication channel being coupled to the primary communication controller in each of the set of powered elements forms a set of secondary communication channels to the set of powered elements;

issue a request for data to the one or more powered elements using one or more of the secondary communication channels in the set of secondary communication channels in response to a reduction in the level of communications to the one or more powered elements being detected, wherein the set of secondary communication channels comprises one or more alternating current power lines and wherein the request is sent as data injected onto the alternating current power lines to the primary communication controller in each of the one or more powered elements;

receive the data using the set of one or more of the secondary communication channels from the one or more powered elements;

analyze the data to determine a set of recovery actions to restore the level of communications to the one or more powered elements in the set of powered elements over the set of primary communication channels coupled to the primary communication controller in each of the one or more powered elements; and issue the set of recovery actions to the one or more powered elements using the one or more of the secondary communication channels, wherein the set of recovery action is received by the primary communication controller in each of the one or more powered elements and wherein a primary controller in each of the one or more powered elements execute the recovery actions to restore the level of communications to the one or more powered elements in the set of powered elements over the set of primary communication channels coupled to the primary communication controller in each of the one or more powered elements.

9. The system of claim 8, wherein the instructions further cause the processor to: detect, via the primary communication controller, restoration of the set of primary communication channels to the one or more of powered elements.

10. The system of claim 8, wherein the instructions to receive the data from the one or more powered elements further cause the processor to:

receive the alternating current power lines with the data; and extract the data from the alternating current power lines.

11. The system of claim 8, wherein the request for data is a data capture command and wherein the data capture command is at least one of error logging, event tracing, or register dumping.

12. The system of claim 8, wherein the set of recovery actions include at least one of an isolation command or a reset command.

13. The system of claim 8, wherein a powered element in the set of powered elements is a field replaceable unit and wherein the field replaceable unit is at least one of a computer, router, switch, modular storage element, controller, printer, disk drive module, or serial attached SCSI hard disk drive.

14. The system of claim 8, wherein the set of powered elements reside within a set of equipment racks in a rack system.

15. A method, in a data processing system, for providing reliable redundant data communications, the method comprising:

detect a reduction in a level of communications to one or more powered elements in a set of powered elements over a primary communication channel coupled to a primary communication controller in each of the set of powered elements, wherein the primary communication channel being coupled to the primary communication controller in each of the set of powered elements forms a set of primary communication channels to the set of powered elements, wherein each primary communication controller is further coupled to a secondary communication channel, and wherein the secondary communication channel being coupled to the primary communication controller in each of the set of powered elements forms a set of secondary communication channels to the set of powered elements;

issue a request for data to the one or more powered elements using one or more of the secondary communication channels in the set of secondary communication channels in response to a reduction in the level of communications to the one or more powered elements being detected, wherein the set of secondary communication channels comprises one or more alternating current power lines and wherein the request is sent as data injected onto the alternating current power lines to the primary communication controller in each of the one or more powered elements;

receive the data using the set of one or more of the secondary communication channels from the one or more powered elements;

analyze the data to determine a set of recovery actions to restore the level of communications to the one or more powered elements in the set of powered elements over the set of primary communication channels coupled to the primary communication controller in each of the one or more powered elements; and issue the set of recovery actions to the one or more powered elements using the one or more of the secondary communication channels, wherein the set of recovery action is received by the primary communication controller in each of the one or more powered elements and wherein a primary controller in each of the one or more powered elements execute the recovery actions to restore the level of communications to the one or more powered elements in the set of powered elements over the set of primary communication channels coupled to the primary communication controller in each of the one or more powered elements.

16. The method of claim 15, further comprising:

detecting, via the primary communication controller, restoration of the set of primary communication channels to the set of powered elements.

17. The method of claim 15, wherein receiving the data from the one or more powered elements further comprises:

receiving the alternating current power lines with the data; and extracting the data from the alternating current power lines.

18. The method of claim 15, wherein the request for data is a data capture command and wherein the data capture command is at least one of error logging, event tracing, or register dumping.

19. The method of claim 15, wherein the set of recovery actions include at least one of an isolation command or a reset command.

20. The method of claim 15, wherein a powered element in the set of powered elements is a field replaceable unit and wherein the field replaceable unit is at least one of a computer, router, switch, modular storage element, controller, printer, disk drive module, or serial attached SCSI hard disk drive.

\* \* \* \* \*